US009312955B2

(12) United States Patent
Remein et al.

(10) Patent No.: US 9,312,955 B2
(45) Date of Patent: Apr. 12, 2016

(54) METHOD AND APPARATUS TO REDUCE THE IMPACT OF RAMAN INTERFERENCE IN PASSIVE OPTICAL NETWORKS WITH RF VIDEO OVERLAY

(75) Inventors: Duane R. Remein, Raleigh, NC (US); John Lane Moss, Cary, NC (US); Hugh Andrew Lagle, III, Raleigh, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 1355 days.

(21) Appl. No.: 11/532,633

(22) Filed: Sep. 18, 2006

(65) Prior Publication Data

US 2007/0269212 A1    Nov. 22, 2007

Related U.S. Application Data

(60) Provisional application No. 60/747,936, filed on May 22, 2006.

(51) Int. Cl.
*H04B 1/00* (2006.01)
*H04B 10/2537* (2013.01)
*H04J 3/10* (2006.01)
*H04J 3/16* (2006.01)

(52) U.S. Cl.
CPC .............. *H04B 10/2537* (2013.01); *H04J 3/10* (2013.01); *H04J 3/1694* (2013.01)

(58) Field of Classification Search
CPC .................................................. H04B 10/2537
USPC .................................................. 398/168, 159
See application file for complete search history.

(56) References Cited

U.S. PATENT DOCUMENTS

| 5,282,211 | A  | * | 1/1994  | Manlick et al. ................ 714/707 |
| 7,340,180 | B2 | * | 3/2008  | Farmer ............... H04B 10/2537 398/159 |
| 7,424,229 | B2 | * | 9/2008  | Effenberger ....... H04B 10/2916 398/159 |
| 2005/0044119 | A1 | * | 2/2005  | Langin-Hooper et al. .... 708/250 |
| 2006/0039699 | A1 | * | 2/2006  | Farmer ............... H04B 10/2537 398/66 |
| 2006/0140639 | A1 | * | 6/2006  | Effenberger ....... H04B 10/2916 398/159 |
| 2006/0257148 | A1 | * | 11/2006 | Hirth .................. H04B 10/2537 398/71 |

OTHER PUBLICATIONS

Cisco—Ethernet Encapsulation Cheat Sheet, Cisco System, Inc.*
Parson, Dan. "GPON vs EPON: A cost comparison" Lightwave Sep. 2005 (http://lw.pennnet.com/display_article/238749/13/ARTCL/none/none/1/GPON-vs-EPON:-A-cost-comparison).*

* cited by examiner

*Primary Examiner* — David Payne
*Assistant Examiner* — Tanya Motsinger
(74) *Attorney, Agent, or Firm* — Capitol Patent & Trademark Law Firm, PLLC

(57) ABSTRACT

Raman interference (also known as Raman scattering) during an idle frame transmission state in a passive optical network (PON) having radio frequency video overlay is reduced by generating and transmitting data packets having both random data and random length. Randomly varying both the packet data content and the packet length can achieve significant improvement in Raman interference reduction. The random packet data and length in effect spreads the interference across a spectrum wide enough that there is no interference effect perceptible to a television viewer.

5 Claims, 4 Drawing Sheets

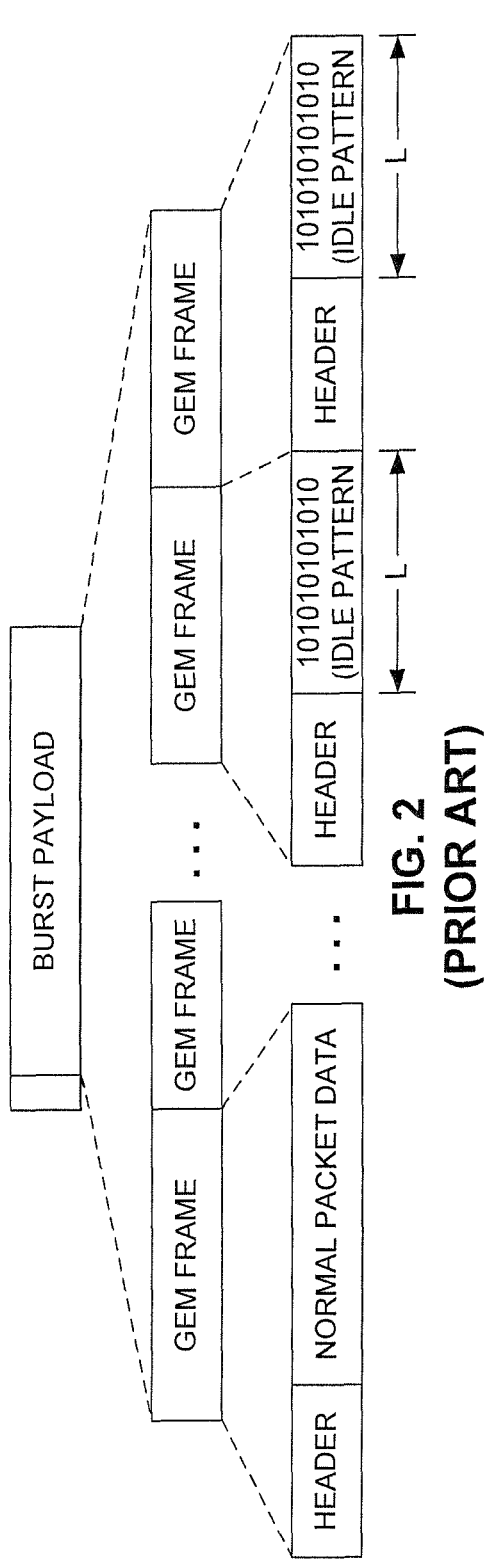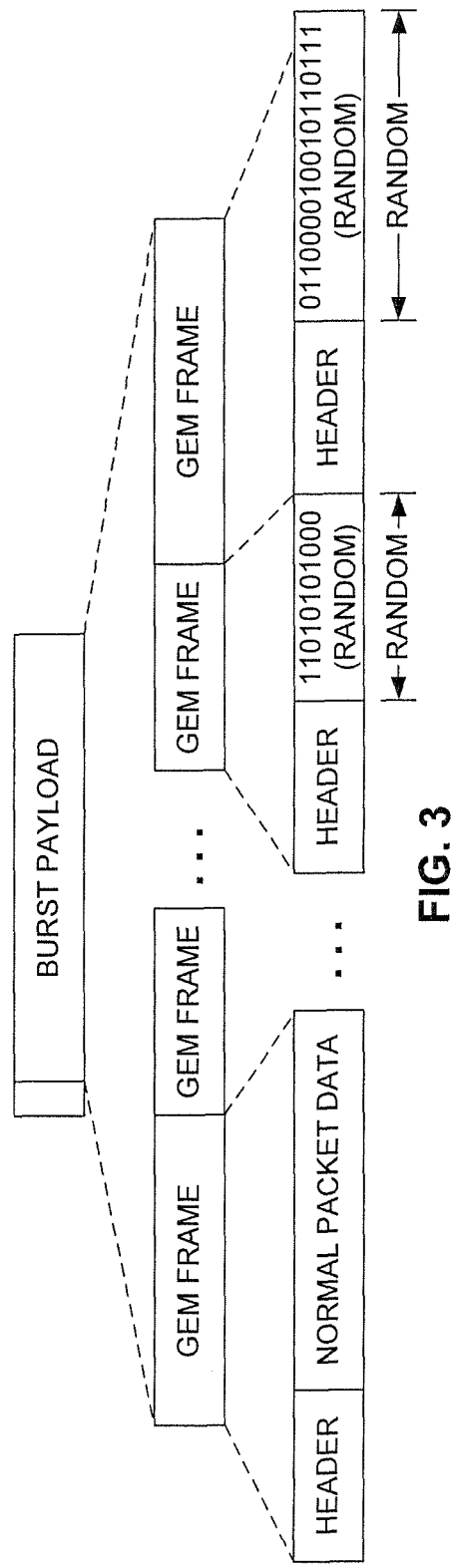

METHOD AND APPARATUS TO REDUCE THE IMPACT OF RAMAN INTERFERENCE IN PASSIVE OPTICAL NETWORKS WITH RF VIDEO OVERLAY

CROSS-REFERENCE TO RELATED APPLICATION

The benefit of the filing date of U.S. Provisional Patent Application Ser. No. 60/747,936, filed May 22, 2006, entitled "METHOD AND APPARATUS TO REDUCE THE IMPACT OF RAMAN INTERFERENCE IN PON NETWORKS WITH RF VIDEO OVERLAY," is hereby claimed and the specification thereof incorporated herein in its entirety by this reference.

BACKGROUND OF THE INVENTION

1. Field of the Invention

The present invention relates generally to passive optical networks (PONs) and, more specifically, to avoiding interference in PONs in which radio frequency video signals are overlayed on packet data signals.

2. Description of the Related Art

Telecommunication service providers are using their networks to deliver an ever-broadening array of services to their subscribers' or customers' homes, businesses or other premises. Whereas once a digital subscriber line (DSL) or cable television line was used solely to provide subscribers with World Wide Web and e-mail access, today's service providers wish to bundle Internet service with voice (telephony) and video (television) services. Such bundled Internet, voice and video service is sometimes colloquially referred to as "triple play" service. The desire to bundle video service along with voice and Internet access has driven telecommunication service providers to turn increasingly to optical fiber-based technologies, such as the passive optical network (PON). Fully optical telecommunications service networks, which some have referred to as "fiber-to-the-premises" (FTTP), are increasingly being developed and deployed.

Most digital telecommunications networks (i.e., networks that facilitate the communication of data, voice, video, etc., between parties or between a content distribution service and subscribers) typically comprise active components, such as repeaters, relays and other such devices that consume power, in the path between a central office (or exchange, as its sometimes referred to) and a subscriber. In addition to requiring power, active components are subject to failure and performance degradation over time, and may require significant periodic maintenance. The passive optical network (PON) has been developed to overcome some of these deficiencies. The essence of a PON is that nothing but optical fiber and passive components are found in the path between the central office and subscribers. A single fiber can run from the central office to a passive splitter located near a group of subscribers, such as a neighborhood or office complex, and individual fibers can run from the splitter to individual subscribers or sub-groups of subscribers.

The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). The IEEE has also adopted Ethernet-based (i.e., IEEE 802.3-based) PON standards referred to as "Ethernet PON" (EPON) and "gigabit EPON" (GEPON). These standards and recommendations are well known to persons skilled in the art to which the invention relates and are therefore not described in further detail in this patent specification.

In accordance with these standards, a PON comprises an optical line terminal (OLT) (also known as optical line terminator), which is typically located at the central office, and a number of optical network terminators (ONTs) (also known as optical network terminals and optical network units), each located at the subscriber's premises (e.g., home, office building, etc.), with optical fiber and one or more splitters between the OLT and ONTs. In the downstream direction, i.e., data transmitted from the OLT (e.g., located at the central office) to an ONT (e.g., located at a subscriber's premises), the data units are broadcast from the OLT to all of the ONTs on the PON, and an ONT can select the data to receive by matching the address embedded in the data units to a previously provisioned or learned address. In other words, an ONT only "listens" to data units having a matching address. Thus, the OLT can transmit data to a particular or selected ONT by addressing it to that ONT. In GPON, the address typically comprises a GPON Encapsulation Method (GEM) Port-ID. In the upstream direction, i.e., data transmitted from an ONT to the OLT, the data units are time-domain multiplexed.

Two methods for delivering video services over a PON are being explored. In one method, the video is digitally encoded using the same transport mechanism and protocol (e.g., Internet Protocol) and transmitted in the same manner as any other digital data transmitted on the PON. In the other method, radio frequency (RF) signals that represent video information are overlayed, using optical wavelength division multiplexing (WDM) techniques, on the digital packet data signals that represent voice, Internet communications and all such other information. In other words, at the service provider's central office or PON head end, the video signal is coupled onto the fiber at a wavelength that is different from the wavelength at which data traffic from the OLT is transmitted on the fiber. Downstream, at each subscriber's ONT, the RF video signal and digital packet data are separated by a triplexer or similar device. In a case in which the RF video signal is transmitted in analog form, the separated video signal can be sent directly to a television set. In a case in which the RF video signal is transmitted in digital form, a set-top box first decodes the signals.

A periodic signal in the optical data stream can interfere with the video signal, causing interference lines on the television screen and thereby degrading the subscriber's viewing experience. This type of interference is due to an effect known as Raman interference or Raman scattering. Transmission of a stream of uniform packets can result in visible degradation of an RF video signal due to Raman interference. As illustrated in FIG. 2, the OLT conventionally transmits non-informational or placeholder "idle" frames bearing some predetermined data pattern to maintain ONT synchronization when no information is to be transmitted, i.e., when the data source is idle. The predetermined pattern is commonly referred to as an idle pattern. (Although the IEEE Ethernet standard (802.3ah) defines idle patterns for Ethernet packets, a simple pattern of alternating ones and zeroes is shown in FIG. 2 for purposes of illustration.) All idle frames have the same length ("L" in FIG. 2). Transmission of a stream of idle frames is problematic in a PON with video overlay because the repetitive idle pattern contains frequency components that overlap the frequencies of video signals.

Solutions for minimizing Raman interference during idle frame transmissions include substituting random data for the idle pattern. Nevertheless, the noise reduction that these solutions provide is not always sufficient to make the effects of Raman interference unnoticeable to a television viewer.

It would be desirable to provide a method and apparatus that reduces Raman interference in a PON with RF video overlay to a level that is unnoticeable to a television viewer. The present invention addresses these problems and deficiencies and others in the manner described below.

SUMMARY OF THE INVENTION

The present invention relates to reducing interference in a passive optical network (PON) having radio frequency video overlay during an idle frame transmission state by generating and transmitting frames having both random data and random length during the idle state. Randomly varying both the packet data content and the packet length can achieve significant improvement in Raman interference reduction. The random frame data and length in effect spreads the interference across a frequency spectrum wide enough that there is no interference effect perceptible to a television viewer.

In an exemplary embodiment of the invention, a pseudo-random pattern generator (PSRPG) can be used. Some of the output bits of the PSRPG can be used to determine the packet length, and some of the output bits can be used to determine the data content. Also, the idle frames can bear a destination address that is not recognized by any optical network terminal (ONT) in the PON, causing all ONTs to discard or ignore such frames.

Alternatively, the invention can entail generating and transmitting frames having random length during the idle state, instead of having both random data and random length.

BRIEF DESCRIPTION OF THE DRAWINGS

FIG. 2 illustrates transmission of idle frames in a conventional or prior art PON.

FIG. 3 illustrates transmission of idle frames in a PON in accordance with the exemplary embodiment of the present invention.

DETAILED DESCRIPTION

Figure 1:
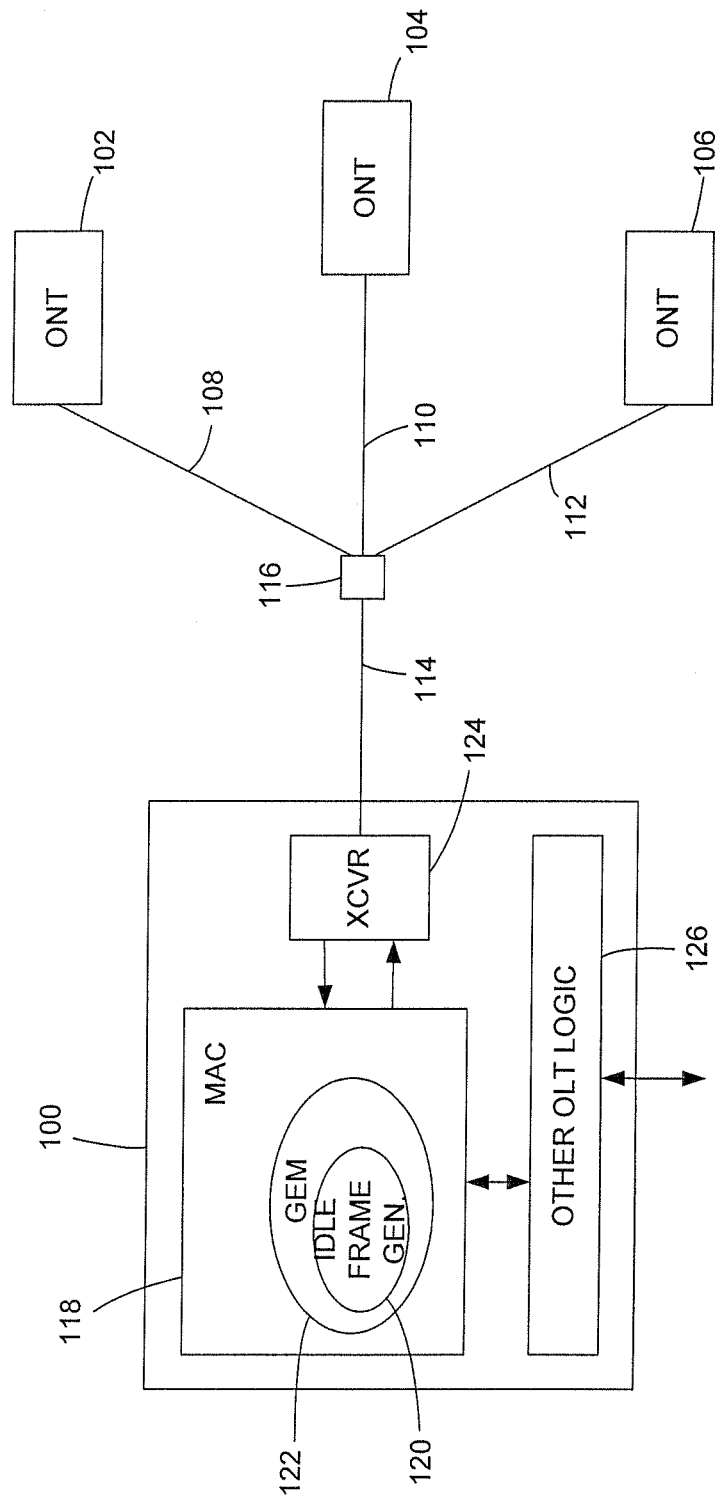
FIG. 1 is a block diagram of a passive optical network in accordance with an exemplary embodiment of the present invention.

As illustrated in FIG. 1, in an exemplary embodiment of the invention, a passive optical network (PON) includes an optical line terminal (OLT) 100 and a number of optical network terminators (ONTs) 102, 104, 106, etc. The OLT 100 is interconnected in the conventional manner with each ONT 102, 104, 106, etc., by optical fibers 108, 110, 112, 114, etc., and one or more optical splitters 116, etc. Although only one such splitter 116 and three such ONTs 102, 104 and 106 are shown for purposes of illustration, the PON can have any other suitable topology and number of ONTs, splitters, fibers, etc. The OLT 100 can be located at, for example, an exchange or central office from which services are provided, such as distribution of television programming and provision of Internet access. The ONTs 102, 104, 106, etc., can be located at, for example, residences or other premises occupied by subscribers to such services. Although data communication in the PON is bidirectional, the present invention relates primarily to the GPON encapsulation method (GEM) that is performed on data packets before they are transmitted in the downstream direction, i.e., from OLT 100 to any of ONTs 102, 104, 106, etc. The communication of data on the PON occurs in the manner well understood in the art and is therefore not described herein in further detail.

The OLT 100 includes a media access controller (MAC) 118 that, as known in the art, controls the majority of OLT functions and thus is analogous to a central processor. MAC 118 is programmed or configured in accordance with the present invention to include idle frame generation logic 120, which controls the method of operation described below with regard to FIG. 4. Idle frame generation logic 120 can be included as part of GPON encapsulation method (GEM) logic 122. Idle frame generation logic 120 and GEM logic 122 are shown in generalized form for purposes of illustration as residing within MAC 118, but as persons skilled in the art will appreciate, this depiction is intended to indicate only that MAC 118 is programmed or configured to perform the corresponding functions of those elements and is not intended to imply any limitations as to where any corresponding software, firmware or other logic must actually or physically reside. As persons skilled in the art understand, such logic can be in any suitable form and can be disposed or distributed in any suitable manner, such as among a number of elements. For example, in an instance in which MAC 118 is embodied in an application-specific integrated circuit (ASIC), it is contemplated that the above-described logic can reside in a suitable portion or portions of the ASIC.

As well understood in the art, GEM is a method or process that comprises encapsulating a data packet (e.g., Ethernet packet) to be transmitted downstream to the PON in a GEM frame. MAC 118 is also programmed or configured with other logic for controlling other OLT functions that do not directly relate to the present invention, but only idle frame generation logic 120 and GEM logic 122 are shown for purposes of clarity. In addition to MAC 118, OLT 100 includes an optical transceiver 124 and other OLT logic 126. Other OLT logic 126 represents logic elements, such as processors, memories, data encoders and decoders, etc., that are conventional and typically included in prior OLTs of the type known in the art. The structure and function of such elements are well known in the art and therefore not described herein in further detail. In other embodiments of the invention, idle frame generation logic 120 can be separate from GEM logic 122 and instead included as part of other OLT logic 126.

As noted above with regard to FIG. 2, in a conventional OLT (not shown) the GEM logic encapsulates normal packet data (e.g., Ethernet packets) in GEM frames as the packet data becomes available from the external data source (not shown) from which the MAC obtains data to be transmitted downstream on the PON. The GEM frame length is variable. A GEM frame consists of a header and the payload, i.e., packet data. The header includes, among other information, the length of the payload or packet data. The MAC causes the GEM frames to be transmitted on the PON as part of a burst transmission in which the frames are preceded by a control block that aids synchronization and provides other information. When no data is available from the source for transmission on the PON, conventional idle frame generation logic (not shown) can substitute packets having a predetermined idle pattern for the (unavailable) packet data to maintain synchronization. It has also been suggested in the prior art to generate a random data pattern (not shown in FIG. 2) instead of a predetermined idle pattern.

As illustrated in FIG. 3, in accordance with an exemplary embodiment of the present invention, when no data is available from the source for transmission on the PON, idle frame generation logic 120 can substitute packets having both random lengths and random data patterns for the (unavailable) packet data. Except as indicated herein, GEM logic 122 otherwise functions in the conventional manner.

Figure 4:
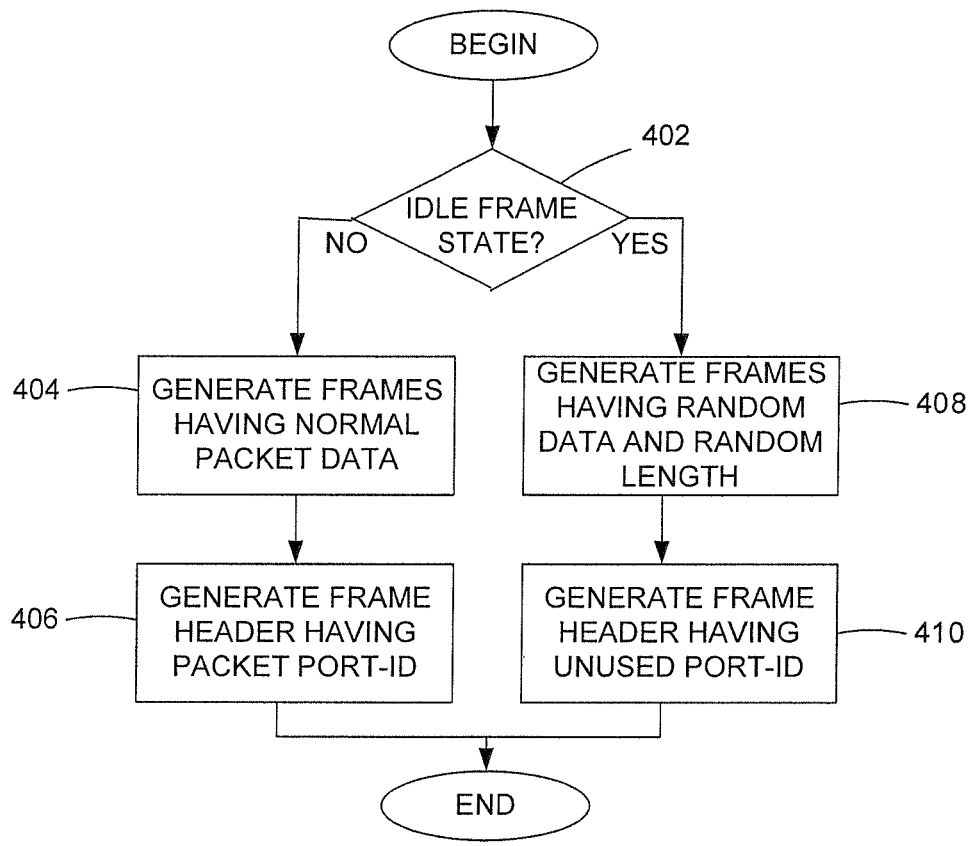
FIG. 4 is a flow diagram of a method for generating idle frames in accordance with the exemplary embodiment.

As illustrated in FIG. 4, the exemplary method by which idle frame generation logic and GEM logic 122 frame packets for transmission on the PON comprises steps 402-410. At step 402, it is determined whether the state of operation indicates that idle frames are to be transmitted (e.g., when no packet data is available). If idle frames are not to be transmitted (e.g., packet data is available), then at step 404 GEM logic 122 uses the available packet data to form a GEM frame payload (see FIG. 3) in the conventional or normal manner. At step 406, GEM logic 122 adds a header to the payload to complete the encapsulation. The header includes, among other information, an address (e.g., GEM Port-ID) that indicates the normal destination of the packet data on the PON. The header also includes the payload length. However, if at step 402 it is determined that idle frames are to be transmitted (e.g., packet data is not available), then at step 408 GEM logic 122 uses the available packet data to form a GEM frame payload (see FIG. 3) having random data and a random length. At step 410, GEM logic 122 adds a header that includes, among other information, the randomly generated length value and an unused or dummy address that will not be recognized on the PON as a valid destination. Thus, ONTs 102, 104, 106, etc., will ignore the data. Following either step 406 or step 410, the GEM frame is ready for transmission on the PON in the conventional manner. As the manner in which MAC 100 (FIG. 1) causes such frames to be transmitted is well understood by persons skilled in the art, it is not described herein.

Figure 5:
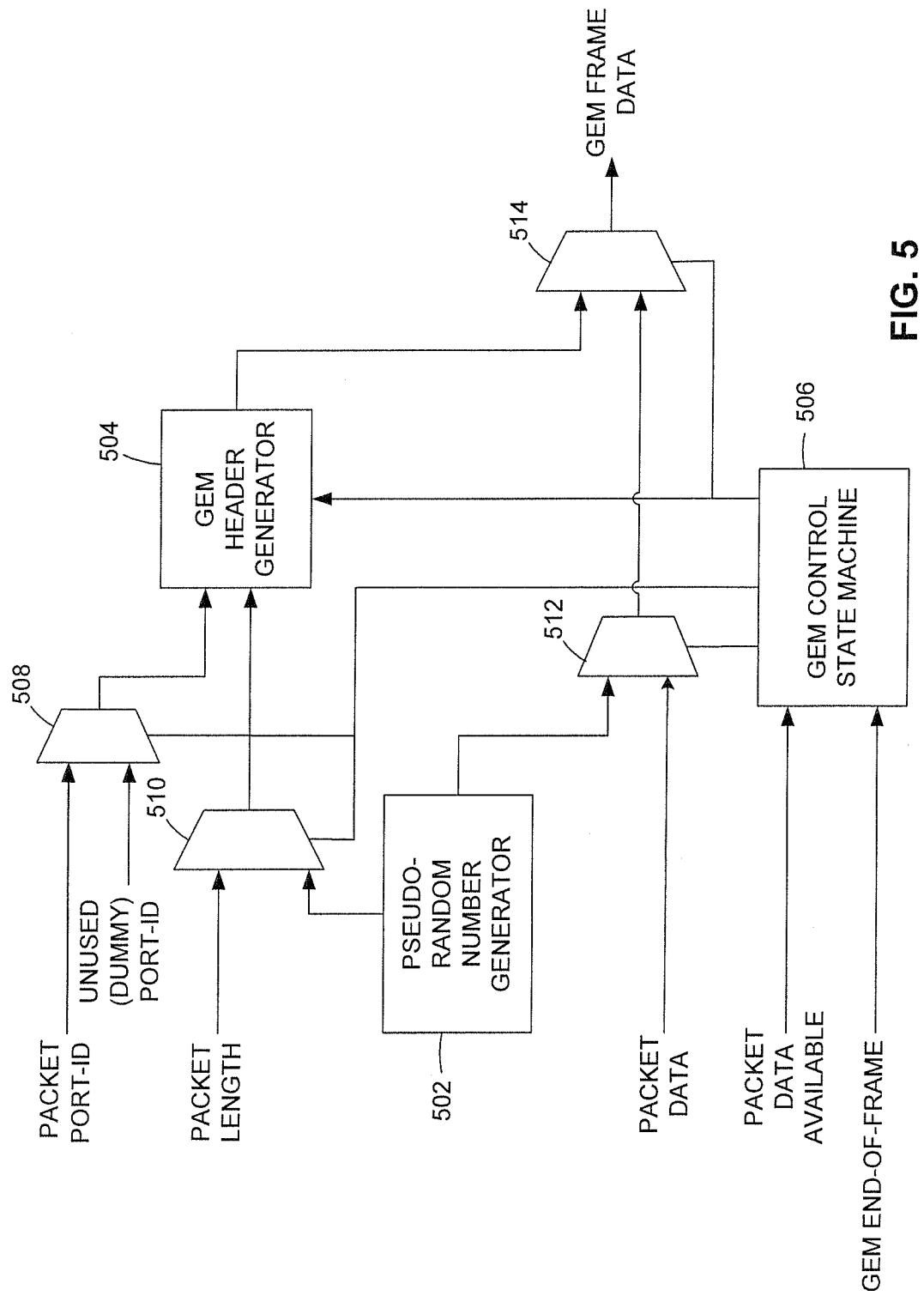
FIG. 5 is a block diagram of frame generation logic in the optical line terminal of FIG. 1 in accordance with the exemplary embodiment.

As illustrated in FIG. 5, in an exemplary embodiment, the relevant portions of GEM logic 122 and idle frame generator 120 can comprise a pseudo-random pattern generator (PSRPG) 502, a GEM header generator 504, a GEM control state machine 506, and a number of selectors 508, 510, 512 and 514. Together, these elements effect the method described above with regard to FIG. 4. GEM control state machine 506 responds to signals indicating that packet data is available and indicating the end of a GEM frame by asserting signals that control selectors 508, 510, 512 and 514. Specifically, when the GEM frame header is being generated and when the signal indicates that packet data is available, GEM control state machine 506 causes selector 508 to select the Port-ID of the packet destination, causes selector 510 to select the length of the packet, and causes selector 514 to select the header that GEM header generator generates in response to the selected inputs. Accordingly, when the GEM frame payload is being generated and the signal indicates that packet data is available, GEM control state machine 506 causes selector 512 to select the available packet data and causes selector 514 to select the output of selector 512 as the GEM frame payload. In contrast, when the GEM frame header is being generated and the signal indicates that packet data is not available, GEM control state machine 506 causes selector 508 to select the unused or dummy Port-ID, causes selector 510 to select a random number generated by PSRPG 502 as the packet length, and causes selector 514 to select the header that GEM header generator 504 generates in response to these selected inputs. Accordingly, when the GEM frame payload is being generated but the signal indicates that packet data is not available, GEM control state machine 506 causes selector 512 to select a random number generated by PSRPG 502 as the packet data and causes selector 514 to select the output of selector 512 as the GEM frame payload. Note that the randomly generated length is reflected both in the length of the payload and in the corresponding length field that is included in the header.

Figure 6:
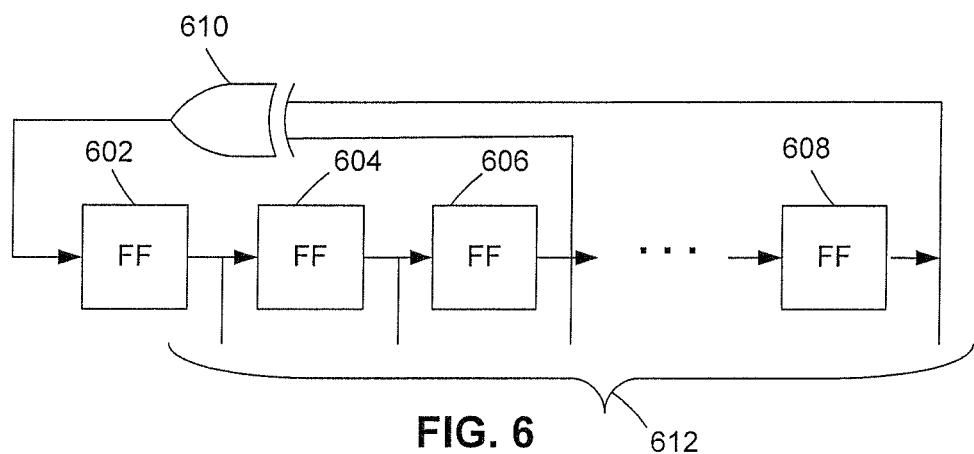
FIG. 6 is a block diagram of a linear-feedback shift register for generating random values in accordance with the exemplary embodiment.

PSRPG 502 can comprise, for example, a linear-feedback shift register of the well-known type shown in FIG. 6. A 23-bit linear-feedback shift register having 23 corresponding registers or flip-flops 602, 604, 606, 608, etc., with feedback bits from several registers combined through exclusive-OR logic 610 has been used with success in simulations, but PSRPG 502 can have any other suitable arrangement and number of registers. As well understood in the art, an N-bit linear-feedback shift register, initialized to some seed state, will cycle through a sequence of $2^N-1$ states before repeating the sequence, thereby producing a seemingly random pattern. Some of the output bits 612 can be used as the input to selector 510 to provide the random packet length, and other output bits 612 can be used as the input to selector 512 to provide the random packet data. Although in the exemplary embodiment of the invention PSRPG 502, comprising a linear feedback shift register, is used to generate the random data, in other embodiments any other suitable logic or other means can be used.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for reducing interference in a passive optical network
   (PON) having radio frequency video overlay during an idle frame transmission state, the method comprising:
   detecting an idle frame transmission state in response to a signal indicating that packet data is not available:
   generating a first random number as a random length for an idle pattern and generating a second random number as random data of the idle pattern;
   generating frames having headers comprising the first random length while idle frame transmission state is detected,
   generating frames having headers with destination addresses not associated with any optical network terminal of the PON while the idle frame transmission state is detected;
   generating frames for transmission on the PON using the idle pattern in response to the detection of the idle frame transmission state; and
   generating frames for transmission on the PON having source data while the idle frame transmission state is not detected.

2. The method claimed in claim 1, wherein:
   the step of generating frames for transmission on the PON using the random length, random data idle pattern conforms to the GPON encapsulation method (GEM) standard; and
   the step of generating frames for transmission on the PON having source data conforms to the GPON encapsulation method (GEM) standard.

3. A system for reducing interference in a passive optical network (PON) having radio frequency video overlay during an idle frame transmission state, the system comprising: a pseudo-random pattern generator for generating as separate outputs a First random number and a second random number;

generator logic for utilizing the first random number to determine a length of an idle pattern and utilizing the second random number as random data of the idle pattern;

header generator logic for generating frames having headers comprising the first random length while the idle frame transmission state is detected, and generating frames having headers with destination addresses not addressed to any optical network terminal of the PON while the idle frame transmission state is detected: and control logic for recognizing an idle frame transmission state upon receipt of a signal that packet data is not available and enabling generation of frames for transmission on the PON having source data while the idle frame transmission state is not detected and enabling generation of frames for transmission on the PON using the identified idle pattern in response to the detection of the idle frame transmission state.

4. The system claimed in claim 3, wherein the generator logic conforms to the GPON encapsulation method (GEM) standard.

5. The system claimed in claim 3, wherein the pseudo-random number generator comprises a linear-feedback shift register.

\* \* \* \* \*